US011928686B2

(12) United States Patent
Germain et al.

(10) Patent No.: US 11,928,686 B2
(45) Date of Patent: *Mar. 12, 2024

(54) SECURE IDENTITY DATA TOKENIZATION AND PROCESSING

(71) Applicant: ROYAL BANK OF CANADA, Toronto (CA)

(72) Inventors: Benoit Germain, Toronto (CA); Arnold Badal-Badalian, Toronto (CA); Seung Bong Baek, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,364

(22) Filed: Jul. 13, 2021

(65) Prior Publication Data

US 2022/0012739 A1 Jan. 13, 2022

Related U.S. Application Data

(60) Provisional application No. 63/051,318, filed on Jul. 13, 2020.

(51) Int. Cl.
*G06Q 20/40* (2012.01)
*G06Q 40/03* (2023.01)

(52) U.S. Cl.
CPC ....... *G06Q 20/405* (2013.01); *G06Q 20/4014* (2013.01); *G06Q 20/409* (2013.01); *G06Q 40/03* (2023.01)

(58) Field of Classification Search
CPC ............. G06Q 20/4014; G06Q 20/409; G06Q 40/025; G06Q 20/405; G06Q 40/03
(Continued)

(56) References Cited

U.S. PATENT DOCUMENTS 7,962,788 B2 * 6/2011 Manglik ............... G06F 8/60
717/124
10,417,706 B1 * 9/2019 Simon ................ G06F 3/04817
(Continued)

FOREIGN PATENT DOCUMENTS

CA 2934342 A1 * 6/2015 ............. G06Q 20/02
WO WO-2015013522 A1 * 1/2015 ............. G06Q 20/20

OTHER PUBLICATIONS

Shared Assessments LLC.: Apple Pay—And Dynamic Payment Tokens, Sep. 12, 2014, pp. 1-4 (Year: 2014).*
(Continued)

*Primary Examiner* — Bijendra K Shrestha
(74) *Attorney, Agent, or Firm* — Norton Rose Fulbright Canada LLP

(57) ABSTRACT

A system for secure identity data tokenization and processing, the system adapted to receive a loan provisioning request from a merchant computing device associated with an individual and to receive, from a secure identity verification computing device, a secure identity token data object attesting to an identity of the individual. A secure identity token data object is processed to verify the identity of the individual and to initiate a loan origination process. A request for an electronic transaction to be paid or partially paid using funds represented in the dynamic card token data object associated with the unique loan identifier data value and a a payment package data object is generated to encapsulate a tokenized representation of a dynamic card data object associated with the dynamic card token data object, an electronic representation of the funds to be provided from the dynamic card token data object.

18 Claims, 13 Drawing Sheets

(58) Field of Classification Search
USPC .......................................................... 705/76
See application file for complete search history.

(56) References Cited

U.S. PATENT DOCUMENTS

| | | | |
|---|---|---|---|
| 11,227,332 B1* | 1/2022 | Hecht | G06Q 40/03 |
| 11,373,187 B1* | 6/2022 | Cash | G06Q 20/206 |
| 2018/0174138 A1* | 6/2018 | Subbarayan | G06Q 20/385 |
| 2020/0311734 A1* | 10/2020 | Mardikar | G06Q 20/4016 |
| 2022/0230240 A1* | 7/2022 | Sliwka | G06Q 20/065 |

OTHER PUBLICATIONS

Wex: Credit Card Tokenization: Durable Tokens vs. Transaction-Based Tokens, Nov. 25, 2016, pp. 1-9 (Year: 2016).*
DNP: Embracing a future-focussed "contactless" business, Oct. 21, 2016, pp. 1-8 (Year: 2016).*

* cited by examiner

SECURE IDENTITY DATA TOKENIZATION AND PROCESSING

CROSS-REFERENCE

This application claims all benefit, including priority to, Application No. 63/051,318, filed Jul. 13, 2020, entitled "Secure Identity Data Tokenization and Processing". This application is incorporated herein by reference in its entirety.

FIELD

Embodiments of the present disclosure generally relate to the field of secure data tokens, and more specifically, embodiments relate to devices, systems and methods for communicating and processing secure data tokens.

INTRODUCTION

The secure verification of identity can be a challenge where individuals are not physically present for verification by an entity seeking to disburse funds to such individuals. Verification of identity is important to prevent fraud and other malicious behaviors, and poor verification of identity can lead to downstream issues.

A challenge with secure verification is in-person verification may not be possible or practical, especially during pandemic/social distancing situations, or where the purchase is for a time-limited release of a large value item, such as a video game console or a furniture.

SUMMARY

A proposed, computerized approach is described in various embodiments that can be operable in scenarios where individuals can be securely verified without presenting their credentials physically to the lending organization. This approach can be especially useful in scenarios where it is impractical for the individuals to travel to branches of the lending organization, such as where transaction values are small/frequent, or where there are health concerns in relation to social activities (e.g., even for large transaction values).

Accordingly, data tokenization and the use of secure identity tokens is utilized as a technical solution whereby devices remote to the lending organization, such as merchant devices and personal devices associated with an individual are able to, through electronic communication, conduct loan transactions where a lending organization is an intermediary whose systems control the disbursement of funds.

The tokenized loan transactions are useful, for example, in scenarios where (1) a transaction is being made online, (2) a transaction is being made at a merchant's physical store and where the individual adduces identification at the point of sale, and (3) a transaction is being made at a merchant's physical store and where the individual utilizes a token-based service to establish identity. The technical solution described herein allows for the rapid provisioning of dynamic financial relationships, such as loans, relying on secure tokens and specific computerized workflows between remote computing devices for identity verification. Specific technical implementation using computer-based approaches for secure tokenization is utilized to encapsulate data for a secure and computationally efficient approach for establishing dynamic cards whose states are updated as the dynamic cards are interacted with. Computerized approaches are utilized to reduce a need for in-person verification while attempting to computationally maintain a level of security and authentication using cryptography.

A benefit to the described approach is that a payment mechanism can be shared between a merchant (e.g., a point of sale), without the need to issue a plastic card for the individual in respect of a lending loan. The loan can be a reusable credit with a given credit amount, such as a revolving account whose parameters are periodically maintained as a data structure in a financial institution's backend computing systems. The payment mechanism can include account number details from the financial institution, which is required for repayment of the loan.

The system can be implemented as a protocol for coordinating communications and computing activities as between a number of remote devices, such as a merchant/point of sale terminal, a personal device associated with the individual, and a financial institution backend computing system.

The system can, in some embodiments, be physically implemented as a server or a computer residing in a data center associated with the financial institution, configured to handle incoming requests for loans being established for users seeking to transact in (i.e., purchase) goods or services at merchants and to orchestrate the identity and loan transaction process such that the transaction can be satisfied through a loan provisioned by the financial institution and ultimately paid out to the merchant in partial or full payment for what is owed by the user. The server or computer residing in the data center can interact with other financial institution subsystems, such as upstream systems (e.g., information data storage repositories for identify and account verification) and downstream systems (e.g., updating computerized records or repositories of loan amounts based on transactions conducted to ensure that records are up to date and that the individual has not exceeded the parameters of the loan).

As the financial institution's representatives do not necessarily need to be physically involved, this systems effectively allows secure loan instantiation at a merchant level while utilizing identity data tokens to securely validate identity.

The system of some embodiments is adapted for secure identity data tokenization and processing, and the system is a backend computer system that includes processors and computer memory, and the system is configured to receive a loan provisioning request from a merchant computing device, the loan provisioning request associated with an individual. For example, the user may be browsing in-browser or on a mobile application, and adding items to a virtual shopping cart.

When the user is undertaking a check-out workflow on the in-browser or mobile application through the merchant's web page or web applications, a selectable visual interface control element (e.g., a button, a logo, a checkbox) can be presented that the user may interact with to indicate that the user wishes to pay using a loan or funds provisioned for the user as part of the check-out workflow.

The loan, for example, can include a partial amortization installment loan, where, for example a client can take a device for a period of time at a particular interest rate, and the residual balance, if existing, at the end of the term, can be paid as a balloon payment. The loan amount, for example, can also include a forward trade-in value, or residual value, which can be established such that the user only pays interest only and it can become due at the end of a term.

The loan can include, for example, a "total borrowing amount", which may or may not be exposed to the user. For example, in respect of the items in the shopping cart of subsequent carts under the same user name and/or payment details, a total borrowing limit may be established based, for example, on credit worthiness, and users may be able to purchase products up to a borrowing limit without the system completing a new credit application. From a backend perspective, the user credit worthiness may automatically be updated on a backend such that if a proxy score for credit worthiness falls below a certain threshold, the user will not be allowed to access the total borrowing limit, even if there is still room in said borrowing limit.

The automated loan process can be embedded directly into the merchant's webpage or web processes without having the user transition to a different user experience. As noted herein, some embodiments are adapted for merchant payment terminals in-store, and accordingly, approaches are adapted to be channel agnostic and/or merchant agnostic, providing deep integration with merchant payment processes.

From a backend perspective, the user's client device then receives, from a secure identity verification computing device, a secure identity token data object attesting to an identity of the individual, which can be a cryptographic token associated with a participating financial institution or other trusted institution, signed, for example, using a private key associated with the trusted institution such that the signature and underlying token can be validated against a corresponding public key (corresponding to the private key). The token can be associated with a generated loan identifier corresponding to an automatically generated loan account.

The user's client device, for example, can upload or otherwise transmit a data message storing the signed data object to the merchant's webpage or web processes, or in other embodiments, the financial institution systems can upload or otherwise transmit a data message storing the signed data object to the merchant's webpage or web processes, which process the secure identity token data object to verify the identity of the individual and to initiate a loan origination process for a dynamic card token data object having the unique loan identifier data value and maintained, for example, on a non-transitory computer readable storage medium of the financial institution systems.

When the user finalizes the checkout process, the computing system may receive a data message indicative of a request for an electronic transaction to be paid or partially paid using funds represented in the dynamic card token data object associated with the unique loan identifier data value, and then generate a payment package data object encapsulating a tokenized representation of a dynamic card data object associated with the dynamic card token data object, an electronic representation of the funds to be provided from the dynamic card token data object.

To conclude the transaction, the computing system can then be configured to transmit the payment package data object to the merchant computing device, the merchant computing device processing the payment package data object in completion of the electronic transaction.

In a first variation, the process described above is conducted through an entirely web-based checkout process whereby the loan is being provisioned for an entirely online purchase, and the payment processors and point of sale devices are e-commerce checkout devices that operate entirely through web processes.

In a second variation, the process includes an approach whereby a user initiates the loan process through a web-process (e.g., interacting with a merchant website via a web browser), and instead chooses to utilize an existing physical card (e.g., debit, credit card) to finalize the loan section of the transaction. The loan is provisioned prior to the in-store transaction, and the card number and/or other identifier extracted from the physical card is utilized (e.g., used as a reference or a lookup to identify existing established loans to be used) to generate the dynamic payment package which the merchant then utilizes to transmit as a data message to the financial institution computing systems to request funds from the pre-established loan account such that funds are released to the merchant computing system in satisfaction of the payment. A nominal (e.g., $0.01) or zero value transaction can be conducted on the physical card or an account associated thereof to ensure validity of the physical card.

In a third variation, the process includes an approach where similarly, the user initiates the loan process through a web-process, but rather, the loanID is initially generated in a digitally encoded package with a security element and readable/scan-able code, such as a QR (quick response) code. When the user physically enters the store, a checkout process at a point of sale terminal at the physical store is utilized whereby the user is able to select a pay with loan mechanism. The user presents the digitally encoded package to the point of sale terminal, and a verification process is automatically initiated whereby a client identification corresponding to the initial account that generated the loan ID and encapsulated into the digitally encoded package is required to be verified by the user's client device with the corresponding financial institution computing systems to be prior to the digitally encoded payment package being accepted for payment for transmission in the data message to the financial institution computing systems to request funds from the pre-established loan account such that funds are released to the merchant computing system in satisfaction of the payment.

Corresponding systems, devices, methods, and non-transitory computer readable media storing computer-interpretable instructions thereon for execution by a processor are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1B is extended to FIG. 1C.

DETAILED DESCRIPTION

A proposed, computerized approach is described in various embodiments that can be operable in scenarios where individuals can be securely verified without presenting their credentials physically to the lending organization.

This automated approach is particularly useful in social distancing situations or where it is impractical or impossible for an in-personal validation process to occur (e.g., time-limited purchases, pandemic situations). The automated approach described herein is adapted to utilize computational approaches to improve security and robustness in a loan transaction, while maintaining a consistency of computer interface workflow (e.g., without requiring the user to login to multiple different systems), which is important in maintaining an user experience and reducing the potential for situations where hand-offs between separate user interfaces (e.g., a merchant website and a banking website) fails, and the transaction is left in an incomplete state.

The approach is adapted for providing improved point of sale processing through improved interaction flows whereby a user, using the user's client device, is able to access and/or provision a loan from a participating financial institution directly during a payment workflow on a merchant website or web application, or establish the loan ahead of time and then when physically consummating the transaction in the store, provide or otherwise access secure tokens that are utilized in the provisioning of the loan to pay for all or a portion of the requested goods or services. Example block schematics are provided at FIG. 1A and FIG. 1B for implementation computing architectures, according to some embodiments. FIG. 1B is extended to FIG. 1C.

While not limited to the variations described in the specific examples provided, three example scenarios are provided to illustrate three variant embodiments, a first variant embodiment (FIG. 2) for an automated loan provisioning entirely conducted over web-processes, a second variant embodiment (FIG. 3) for automated loan provisioning conducted in-store using an existing physical card's details as a reference to identify and validate a particular loan token package for payment processes, and a third variant embodiment (FIG. 4) for automated loan provisioning conducted in store where the user's client device uses a validation service to validate the user's identity before the loan token package is validated for payment processes.

Figure 1A:
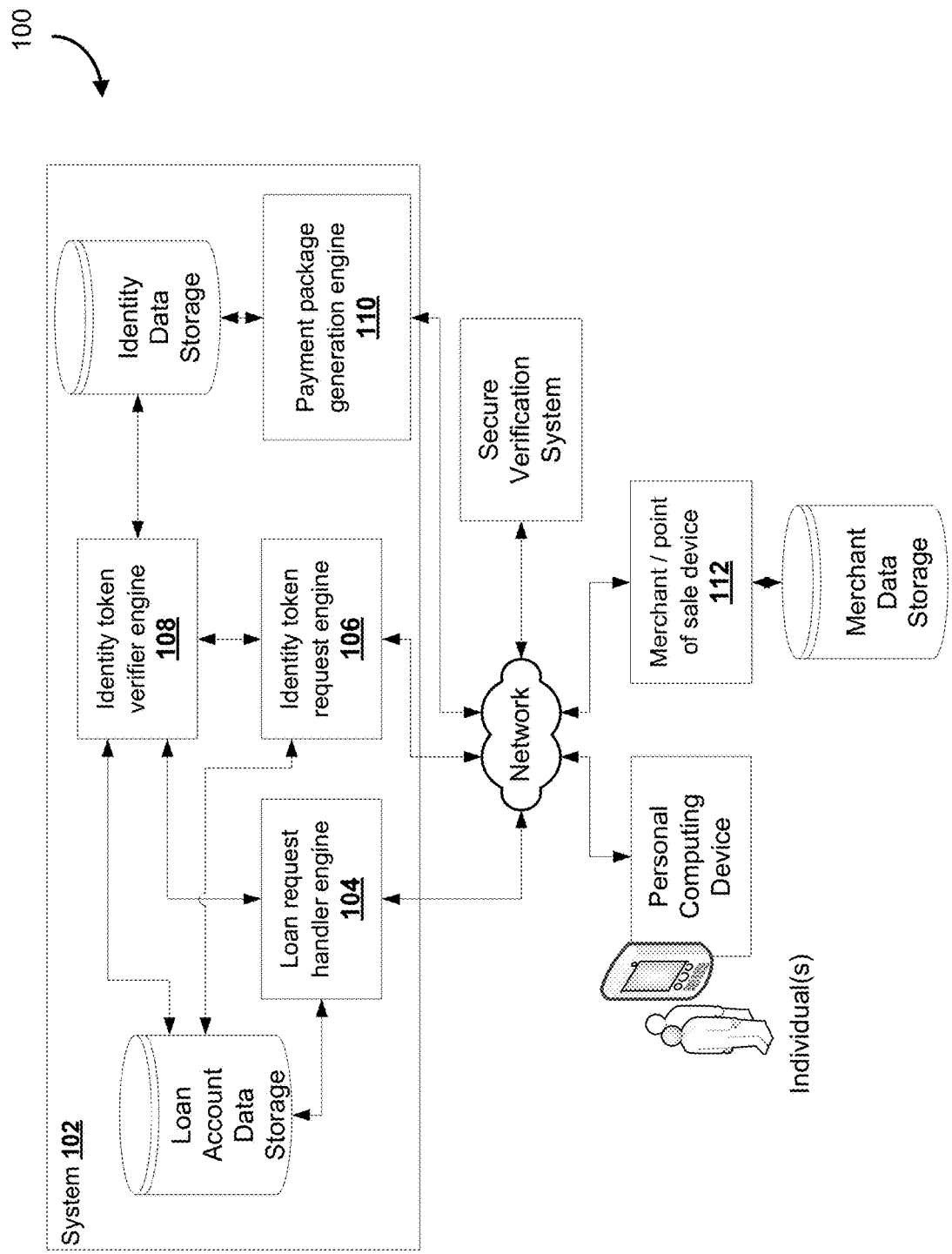
FIG. 1A is a system diagram illustrating an example computer system for secure identity data tokenization and processing, according to some embodiments.
Figure 1B:
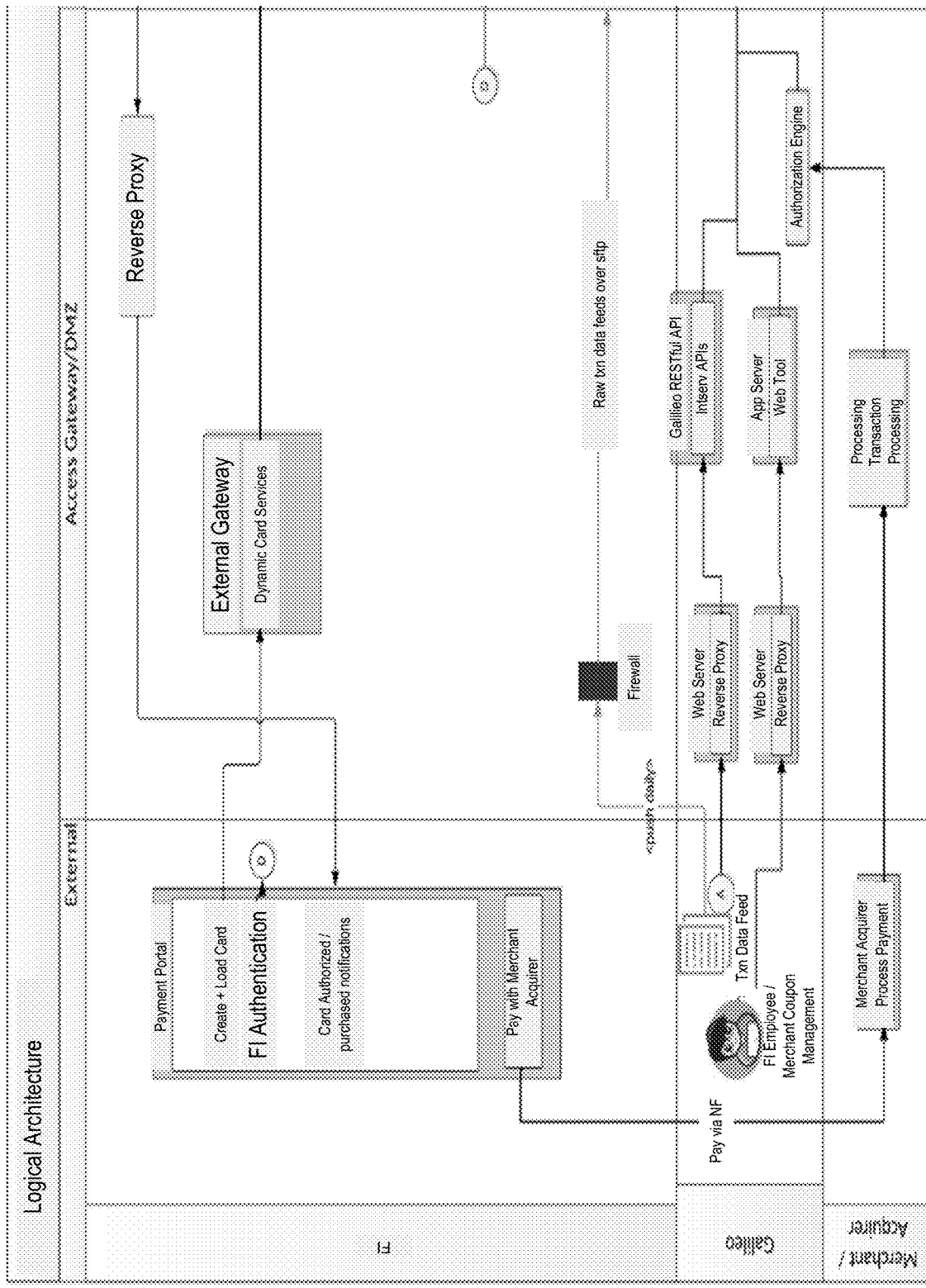
FIG. 1B is an example system architecture diagram showing a more complex example of a system architecture for implementing the secure identity data tokenization and processing system of FIG. 1A, according to some embodiments.
Figure 1C:
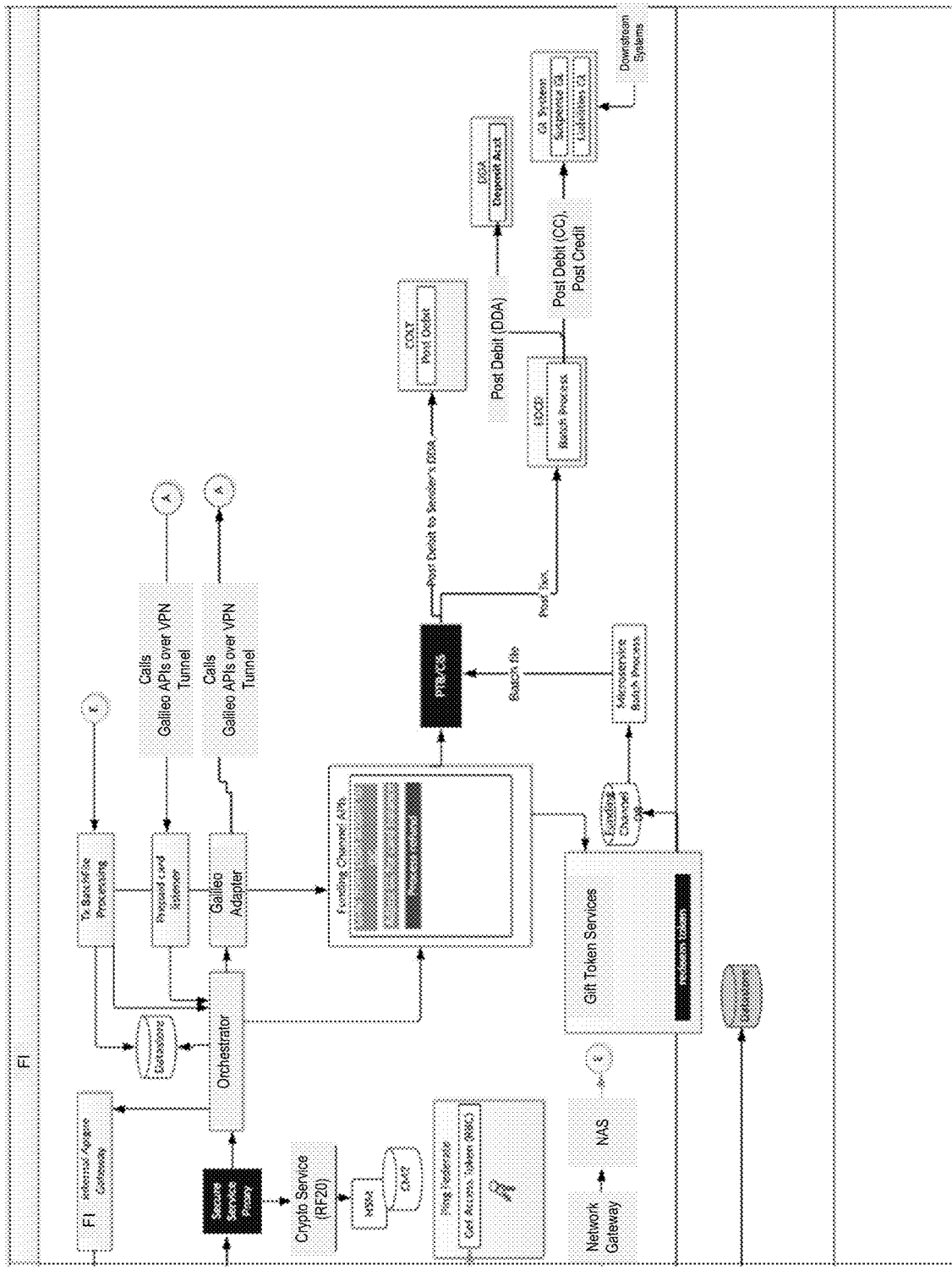

FIG. 1A is a system diagram illustrating an example computer system for secure identity data tokenization and processing, according to some embodiments. FIG. 1B is an example system architecture diagram showing a more complex example of a system architecture for implementing the secure identity data tokenization and processing system of FIG. 1A, according to some embodiments. FIG. 1B is extended to FIG. 1C.

The computer system 100 is specially adapted to instantiate a technical process as between remote computing devices that communicate secure identity tokens amongst one another to remotely attest to identity without the need to physically present credentials to a financial institution at or temporally proximate a time of a transaction. Being able to remotely attest to identity can be especially useful in scenarios where it is impractical for the individuals to travel to branches of the lending organization, such as where transaction values are small/frequent, or where there are health concerns in relation to social activities.

A backend financial institution computing system 102 includes a loan request handler engine 104, a identity token request engine 106, an identity token verifier engine 108, and a payment package generation engine 110. The loan request handler engine 104 is a computing process or a computing device that is adapted to interact with an individual's personal computing device, for example, through a web browser, a mobile application, where the individual is able to, through remote electronic communications, request a loan amount that can be utilized for future transactions. The identity token request engine 106 is configured to prompt the individual's personal computing device to provide an identity token data object, and once provided, receive and store the identity token data object.

The identity token data object can include a securely generated identity token data object, generated, for example, through the use of a secure verification system, such as the Verified.me system where a number of different participating financial institutions cooperate to attest identity of their corresponding clients. The identity token data object is then received by the identity token verifier engine 108, which is configured to process the identity token data object to validate that the information stored therein is temporally valid and a signed attestation of identity by the secure verification system. At this point, the individual is verified and a loan provisioning process is completed. The identity token verifier engine 108 establishes a data value representative of a loan identification (e.g., a LoanID).

These steps may occur, in some embodiments, at some time prior to transactions being conducted (e.g., the loan can be established ahead of the transaction), or in other embodiments, temporally proximate to when the transactions are being conducted. A single loan establishment can be conducted once to support multiple future loans (e.g., a loan of $10,000 can be used for multiple transactions and can be replenished through repayment).

The system 100 can be implemented as a protocol for coordinating communications and computing activities as between a number of remote devices, such as a merchant/point of sale terminal, a personal device associated with the individual, and a financial institution backend computing system.

The individual may then attempt to conduct a transaction at a merchant/point of sale device 112 either in person or online, and request that payment be made through the loan established with backend financial institution computing system 102 corresponding to the loan identifier. The merchant/point of sale device 112 generates an electronic communication to the backend financial institution computing system 102, which then routes the communication to the payment package generation engine 110.

The backend financial institution computing system 102 can, in some embodiments, be physically implemented as a server or a computer residing in a data center associated with the financial institution, configured to handle incoming requests for loans being established for users seeking to transact in (i.e., purchase) goods or services at merchants and to orchestrate the identity and loan transaction process such that the transaction can be satisfied through a loan provisioned by the financial institution and ultimately paid out to the merchant in partial or full payment for what is owed by the user.

The payment package generation engine 110 generates a payment package data object which, in some embodiments, can include creating a dynamic client card if one does not already exist, funding the transaction from the loan (where such funds are sufficient), tokenizing the dynamic client card and/or a tokenized payment into the payment package data object. The payment package data object is then provided to the merchant/point of sale device 112 either as a proxy for funds being released or to trigger the release of funds, and the transaction is completed.

The dynamic card, for example, is adapted such that a dynamic data object can be created that can store data field values indicative of a loan amount to be recorded and maintained on storage coupled to backend financial institution computing system 102. Generation and provisioning ease of use and speed are important considerations for dynamic cards, and in some embodiments, the data objects are generated on the backend to be maintained on a ledger, and a total credit limit/borrowing limit can be associated or otherwise populated as field in the data object. The approval process for the generation and establishing of the total credit limit/borrowing limit can be conducted using fraud analysis processes and/or credit score/credit limit risk engines.

An example dynamic card can include the following example fields: intCardID=4552211029; stringName=Smith, John; boolExistingUser=TRUE, intClientCardAccountNumber=1912939394, floatBorrowingLimit=1000, boolUsedYet=FALSE, loanID=129405, tokenAuthentication=12EEAAC2219989840GACD, intMerchantID=12. The dynamic card data object can include state fields or have different object types that are transitioned to as between different interaction states (e.g., stored as a set of linked objects representing a state machine).

States can include provisioned, accessed but with funds remaining, accessed with no funds remaining, finalized, and expired, for example. State transitions can be automatically triggered based on an event listener configured to poll or receive request information from the various coupled computing devices along with authorizations (e.g., cryptographic keys or signed data objects). Upon validation of each of the events, a state transition can be conducted through execution of a state function. When a state transition is triggered, the dynamic card object can be configured to execute computational methods to invoke downstream processes, such as a ledger reconciliation (e.g., GL reconciliation), electronic funds transfer, among others. Validation can include, for example, verifying that a data object or event message received is duly signed by an encryption key, such as a public key or public keys stored on a certificate management server that is used to attest that a trusted computing device has signed or encrypted the data object or event message. This can include, for example, the public key for a trusted financial institution that will be disbursing the funds. Audit logging and transmission of same can be triggered in each state change.

Accordingly, data tokenization and the use of secure identity tokens is utilized as a technical solution whereby devices remote to the lending organization, such as merchant devices and personal devices associated with an individual are able to, through electronic communication, conduct loan transactions where a lending organization is an intermediary whose systems control the disbursement of funds.

The dynamic card can be tokenized into a secure data object that is encapsulated with additional details and/or information during the transaction process, such as with a transaction amount for the purchase, among others. The dynamic card secure data object can be digitally signed by the backend financial institution computing system 102 using a private key corresponding to the backend financial institution computing system 102 such that the signature can be validated using the public key of backend financial institution computing system 102, and the dynamic card secure data object can then be presented or provided either by the user's client device to the merchant/point of sale device 112, or from the merchant/point of sale device 112 to the backend financial institution computing system 102 to automatically trigger the disbursement of funds associated with the loan account associated with the dynamic card secure data object.

In some embodiments, the dynamic card secure data object can be configured for either one-time use or a limited period of uses or a limited duration of use before the account is automatically converted into an account that can no longer be borrowed from. For example, a Boolean value can be toggled to render the object no longer available for borrowing (e.g., boolUsedYet=TRUE). The dynamic card secure data object is provided with a maximum borrowing amount as in some embodiments, during the loan provisioning workflow, it is not entirely certain what the final borrowing amount is due to the potential for additional fees, additional items being placed into a shopping cart, among others, and an additional amount of space is allocated. In some embodiments, multiple purchases within a duration of time are possible, and can be controlled by data fields in the data object. For example, a user purchasing a video gaming console may wish to add controllers, games, subscriptions, among others, to a shopping cart.

When the transactions are complete or the duration of time has elapsed, a ledger reconciliation process may occur and cause the provisioning of the loan amounts and an electronic payment in satisfaction of the loan amount to the merchant through backend financial institution computing system 102. Once the loan amounts are disbursed, the credit remaining on the dynamic card secure data object is denoted as no longer being available, and the dynamic card secure data object state is converted into a state where it can no longer be used again (e.g., dynamic card has been used and is now closed, and the amount is 'zeroed' out).

Where backend financial institution computing system 102 is processing a large volume of transaction flow, in some embodiments, the backend financial institution computing system 102 is configured to load balance transactions across a distributed set of computing resources (e.g., during a video game pre-sale) to handle increased requests for loans, loan processing, and credit validation during peak times.

In a variant embodiment, the merchant/point of sale device 112 is adapted for an in-store transaction whereby an additional step of verification is conducted whereby the individual presents a physical verification object, such as a debit card or a credit card (e.g., "plastic card") and enters an authentication code (e.g., a PIN) at an input device, such as keypad coupled to the merchant/point of sale device 112. The authentication code can then be validated, for example, by the automatic processing of a $0.00 transaction or other type of nominal transaction (e.g., $0.01). The card number of the physical verification object (e.g., an integer) and validation success of the authentication code (e.g., a Boolean value) can be transmitted to the backend financial institution computing system 102 for an additional step of verification prior to the payment package generation engine 110 generating and transmitting the payment package data object to the merchant/point of sale device 112.

In another variant embodiment, the merchant/point of sale device 112 is adapted for an in-store transaction whereby an additional step of verification is conducted whereby the individual utilizes, instead of the physical verification object, a verification process established through the secure verification system (which may be the same secure verification system that was utilized to establish the LoanID). A second round of authentication and identity attestation can be conducted temporally proximate to the transaction, and the secure verification system can conduct another identity verification whereby a validation success value (e.g., a Boolean value) can be transmitted to the backend financial institution computing system 102 for an additional step of verification prior to the payment package generation engine 110 generating and transmitting the payment package data object to the merchant/point of sale device 112.

A benefit to the described approach is that a payment mechanism can be shared between a merchant (e.g., a point of sale), without the need to issue a plastic card for the individual in respect of a lending loan. The loan can be a reusable credit with a given credit amount, such as a revolving account whose parameters are periodically maintained as a data structure in a financial institution's backend computing systems. The payment mechanism can include account number details from the financial institution, which is required for repayment of the loan. As described above, the loan transactions are useful, for example, in scenarios where (1) a transaction is being made online, (2) a transaction is being made at a merchant's physical store and where the individual adduces identification at the point of sale, and (3) a transaction is being made at a merchant's physical store and where the individual utilizes a token-based service to establish identity. The technical solution described herein allows for the rapid provisioning of dynamic financial relationships, such as loans, relying on secure tokens and specific computerized workflows between remote computing devices for identity verification.

Figure 2:
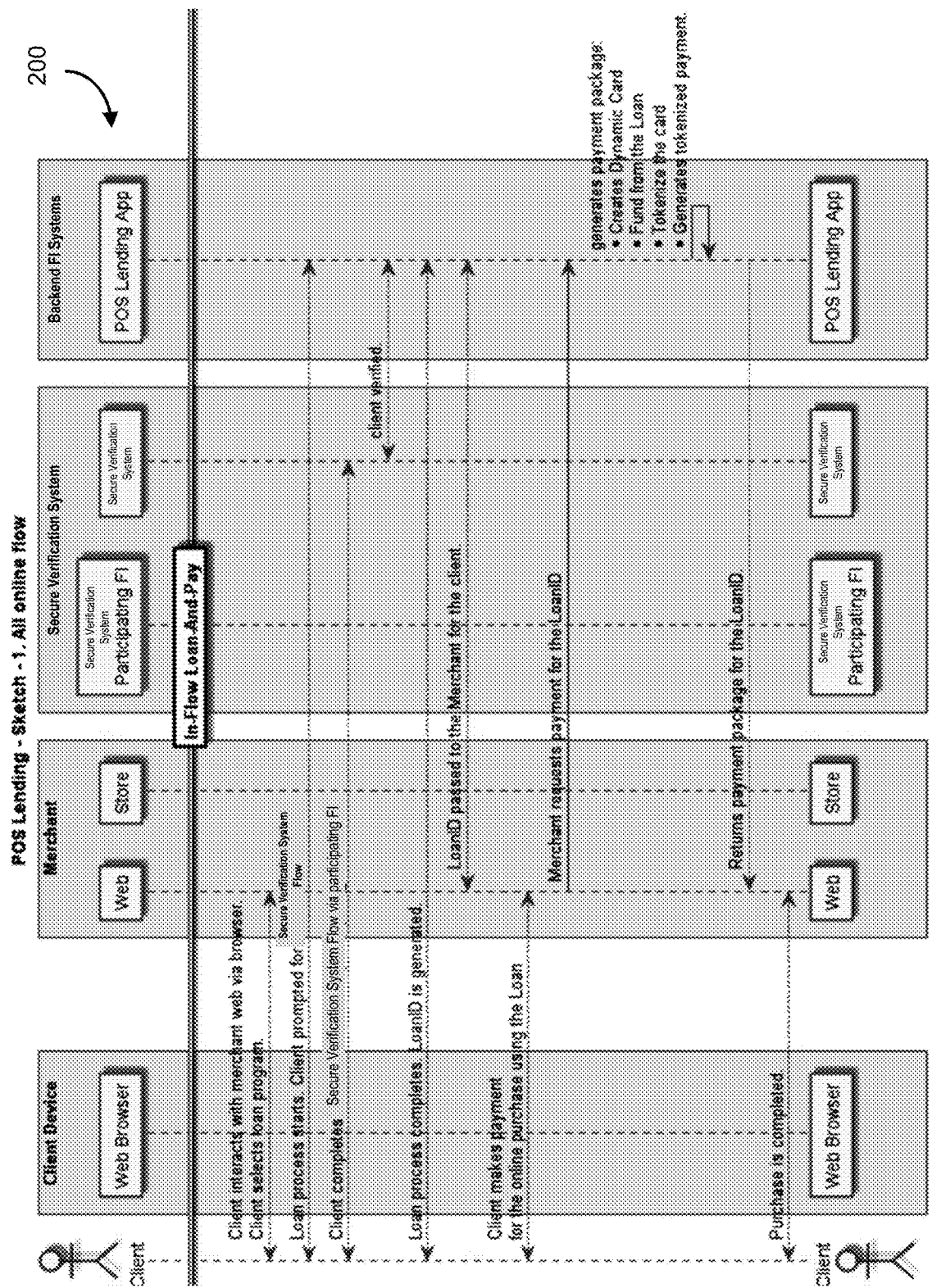
FIG. 2 is a method diagram showing example steps of an online based token processing workflow, according to some embodiments.

FIG. 2 is a method diagram showing example steps of an online based token processing workflow, according to some embodiments. In workflow 200, the individual may be utilizing a personal computing device to conduct a transaction with a merchant (e.g., on the merchant's web store), where the individual seeks to have part of, or all of the payment conducted using a loan that is yet to be established with a financial institution. However, the amount may be small and the individual may not wish to undertake the inconvenience of interacting directly with the financial institution to request a loan to be paid out to his/her personal accounts, which can then be used for paying for the purchase with the merchant.

In this example, when the individual is conducting the transaction with the merchant, the individual can select a "pay with loan" using an interactive widget (e.g., a widget button on a widget bar), for example, on the merchant's graphical user interface that connects automatically with the backend financial institution computing system 102. When this widget is selected, the individual initiates a verification process whereby the individual attests his/her identity through the usage of the secure verification system (e.g., a system that can be used across multiple financial institutions where attestations are given in the form of identity tokens when the individual logs into his/her account corresponding to a financial institution used by the individual). The identity tokens corresponding to the individual are then provided to the identity token verifier engine 108 of the backend financial institution computing system 102 and verified.

A LoanID data object is then generated, and this data object is provided to the merchant, which then interfaces on the backend with the backend financial institution computing system 102 to establish payment or a proxy thereof representing a future payment from the financial institution in respect of the individual's transaction for the online purchase using the loan. The payment package generation engine 110 generates the payment data object, which, in some embodiments, can include creating a dynamic, virtual card for the individual (e.g., if the individual was not a prior client of the financial institution) associated with the loan account, funds the purchase with funds from the loan account, tokenizes the card, and establishes a tokenized payment to be transmitted back as a payment data object that encapsulates various computer based instructions and data sets. The payment data object is accepted as payment or partial payment for the transaction by the merchant.

As the financial institution's representatives do not necessarily need to be physically involved, the system effectively allows secure loan instantiation at a merchant level while utilizing identity data tokens to securely validate identity.

Figure 3:
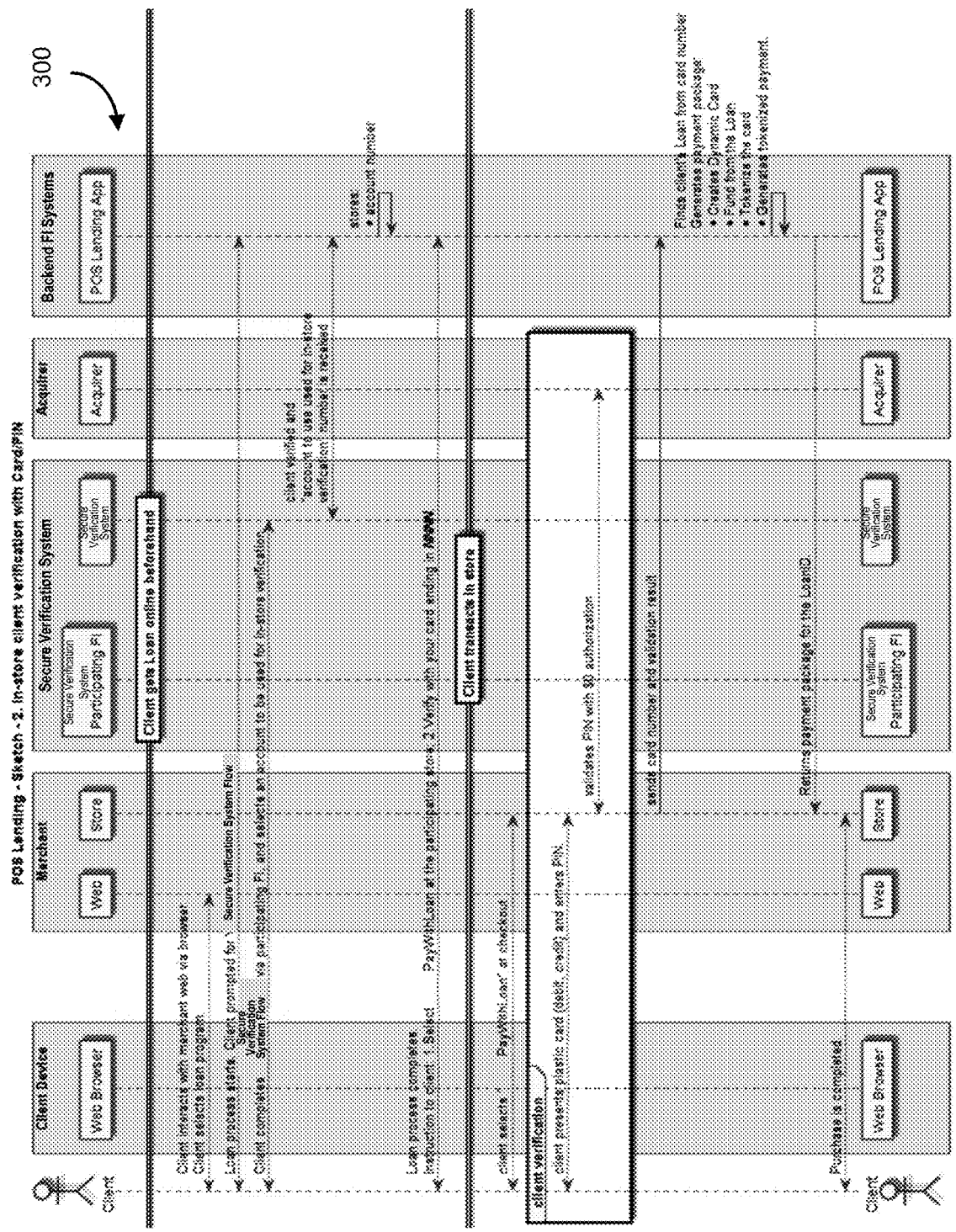
FIG. 3 is a method diagram showing example steps of an in-store based token processing workflow where an individual's identity is attested using physical card security credentials, according to some embodiments.

FIG. 3 is a method diagram showing example steps of an in-store based token processing workflow where an individual's identity is attested using physical card security credentials, according to some embodiments.

In workflow 300, the individual may be utilizing a personal computing device to conduct a transaction with a merchant (e.g., on the merchant's web store), where the individual seeks to have part of, or all of the payment conducted using a loan that is yet to be established with a financial institution. However, the amount may be small and the individual may not wish to undertake the inconvenience of interacting directly with the financial institution to request a loan to be paid out to his/her personal accounts, which can then be used for paying for the purchase with the merchant.

In this example, when the individual is conducting the transaction with the merchant, the individual can select a "pay with loan" using an interactive widget (e.g., a widget button on a widget bar), for example, on the merchant's graphical user interface that connects automatically with the backend financial institution computing system 102. When this widget is selected, the individual initiates a verification process whereby the individual attests his/her identity through the usage of the secure verification system (e.g., a system that can be used across multiple financial institutions where attestations are given in the form of identity tokens when the individual logs into his/her account corresponding to a financial institution used by the individual). The identity tokens corresponding to the individual are then provided to the identity token verifier engine 108 of the backend financial institution computing system 102 and verified.

A LoanID data object is then generated, and this data object is provided to the merchant, which then interfaces on the backend with the backend financial institution computing system 102 to establish payment or a proxy thereof representing a future payment from the financial institution in respect of the individual's transaction for the online purchase using the loan.

This step can be conducted online prior to the actual transfer or transaction taking place in-store. When the individual physically is present at a store or in proximity of a merchant/point of sale device 112, the individual can select, for example, through a corresponding graphical user interface button or physical button on an input device into a terminal, a pay with loan option at checkout.

An additional verification step occurs where the individual is required to present payment credentials which are used for attesting identity. For example, the payment credentials may be provided through a physical, plastic card (e.g., a debit card, a credit card) that is entered into the terminal or in electronic communication thereof (e.g., NFC) and the individual is requested to enter a PIN. A nominal transaction or zero dollar transaction is then processed to obtain a validation result, and these numbers and information can be used alongside the identity token data objects by identity token verifier engine 108 to verify the identity of the individual.

The payment package generation engine 110 then generates the payment data object, which, in some embodiments, can include creating a dynamic, virtual card for the individual (e.g., if the individual was not a prior client of the financial institution) associated with the loan account, funds the purchase with funds from the loan account, tokenizes the card, and establishes a tokenized payment to be transmitted back as a payment data object that encapsulates various computer based instructions and data sets. The payment data object is accepted as payment or partial payment for the transaction by the merchant.

Figure 4:
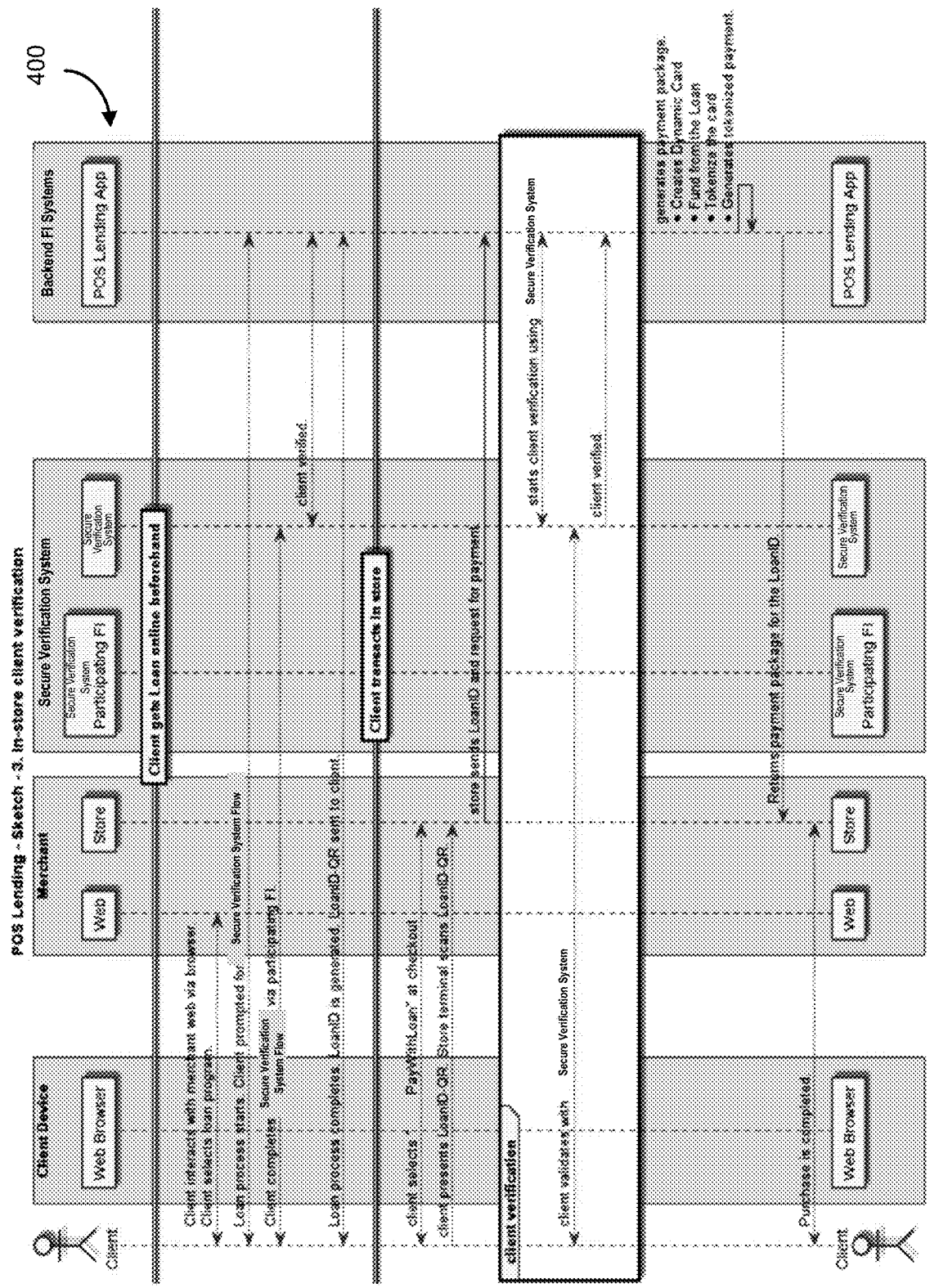
FIG. 4 is a method diagram showing example steps of an in-store based token processing workflow where an individual's identity is attested using identity token credentials, according to some embodiments.

FIG. 4 is a method diagram showing example steps of an in-store based token processing workflow where an individual's identity is attested using identity token credentials, according to some embodiments.

In workflow 400, the individual may be utilizing a personal computing device to conduct a transaction with a merchant (e.g., on the merchant's web store), where the individual seeks to have part of, or all of the payment conducted using a loan that is yet to be established with a financial institution. However, the amount may be small and the individual may not wish to undertake the inconvenience of interacting directly with the financial institution to request a loan to be paid out to his/her personal accounts, which can then be used for paying for the purchase with the merchant.

In this example, when the individual is conducting the transaction with the merchant, the individual can select a "pay with loan" using an interactive widget (e.g., a widget button on a widget bar), for example, on the merchant's graphical user interface that connects automatically with the backend financial institution computing system 102. When this widget is selected, the individual initiates a verification process whereby the individual attests his/her identity through the usage of the secure verification system (e.g., a system that can be used across multiple financial institutions where attestations are given in the form of identity tokens when the individual logs into his/her account corresponding to a financial institution used by the individual). The identity tokens corresponding to the individual are then provided to the identity token verifier engine 108 of the backend financial institution computing system 102 and verified.

A LoanID data object is then generated, and this data object is provided to the merchant, which then interfaces on the backend with the backend financial institution computing system 102 to establish payment or a proxy thereof representing a future payment from the financial institution in respect of the individual's transaction for the online purchase using the loan.

This step can be conducted online prior to the actual transfer or transaction taking place in-store. When the individual physically is present at a store or in proximity of a merchant/point of sale device 112, the individual can use, for example, through a corresponding graphical user interface button or physical button on an input device into a terminal, a "pay with loan" option at checkout.

An additional verification step occurs where the individual can be required to present identity credentials again at or temporally proximate to when the transaction is being conducted in-store. The secure verification system can be utilized to generate a second identity token data object, which can be used by identity token verifier engine 108 to verify the identity of the individual. The second identity token data object may, for example, have a different timestamp than the first, and that may be a requirement for verification (e.g., the second identity token data object has to be generated with defined time period, such as 30 seconds, of the transaction otherwise a timeout occurs).

The payment package generation engine 110 then generates the payment data object, which, in some embodiments, can include creating a dynamic, virtual card for the individual (e.g., if the individual was not a prior client of the financial institution) associated with the loan account, funds the purchase with funds from the loan account, tokenizes the card, and establishes a tokenized payment to be transmitted back as a payment data object that encapsulates various computer based instructions and data sets. The payment data object is accepted as payment or partial payment for the transaction by the merchant. The dynamic, virtual card is established as a dynamic card data object, which, in some embodiments, is or contains the dynamic card data object token, and can be coupled to an existing account of the user (e.g., if the user already has an existing profile), or a new profile can be made. The profile or account can be identified through an identifier ID number, stored, for example, as a number or integer as a field in the dynamic card data object. When the dynamic card data object is initialized, it can be initialized with a set of automated characteristics based on default policy settings of the merchant or the financial institution, indicating, for example, when state transitions can automatically occur based on triggers, such as interactions with users (e.g., purchase transaction being noted), when funds are disbursed, either fully or partially, when a duration of time has elapsed, when a periodic credit check indicates that the dynamic card data object be transitioned (e.g., credit check indicates a score below a threshold).

A listener daemon process may track state change triggering conditions and automatically cause state transitions. When the payment data object is accepted, on the backend, the listener daemon process may receive or otherwise monitor a data message indicating that a state change is to be transitioned on the dynamic card data object, transitioning, for example, to a used state with or without allocation remaining, or to a finalized state such that the dynamic card data object cannot be used for any further transactions. The state change can cause the invocation of a downstream data process to conduct a reconciliation against a backend ledger to ensure that transactions and state changes are duly recorded through data object updates. In some embodiments, state changes are also tracked along with one or more indicia of verification that was utilized, for example, with a secure verification system of the user's identity.

The indicia of verification can be re-confirmed in some embodiments (e.g., transactions in store) such that a matching or corresponding additional indicia may be required before the state transition can be triggered (e.g., user has to present a plastic card, such as a corresponding debit or credit card that is associated with the dynamic card and enter a correct PIN, shown in an example process flow in FIG. 3). In another example, a second verification flow is required whereby the secure verification system is required to provide a second verification at the time of purchase, for example, as verified through a mobile application residing on the user's device, through a web browser, or through an interface or API call through the point of sale device or terminal (shown, in an example process flow in FIG. 4).

In some embodiments, the disbursement of funds is directly tied to the state transition such that the listener daemon process enforces that there cannot be a disbursement of funds without a corresponding state transition. Accordingly, the dynamic card token can be configured with enhanced security measures such that verification activities and their corresponding provided data elements are tracked for every state transition to improve a security level and reduce risk in view of automated transaction flows. In some embodiments, there further cannot be a disbursement of funds until a confirmation data message is obtained from a ledger reconciliation process.

FIGS. 6A, 6B, 6C, 6D, 6E, 6F are screenshots 600A, 600B, 600C, 600D, 600E, and 600F, respectively, showing an example in-store experience, according to some embodiments.

Figure 6A:
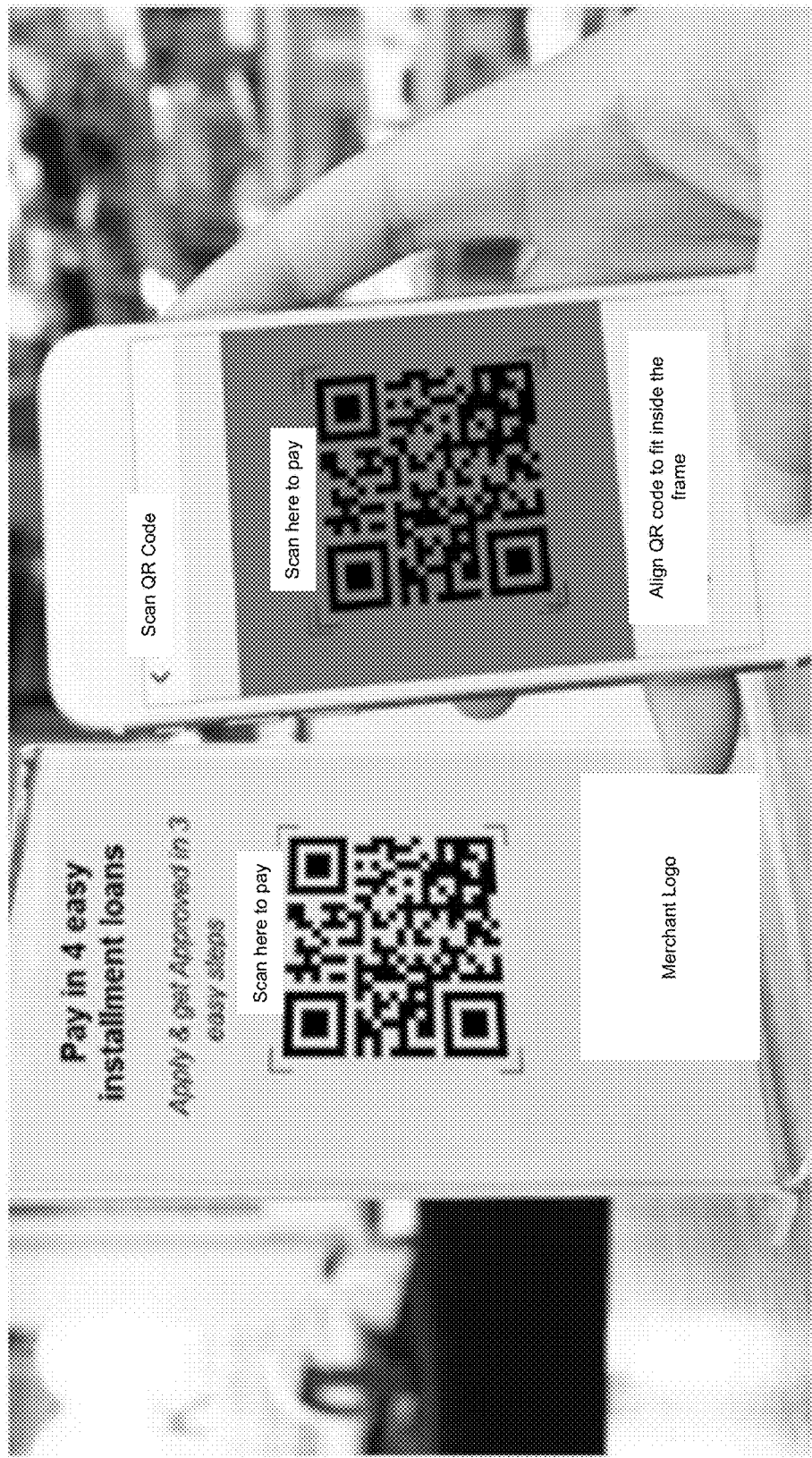
FIGS. 6A, 6B, 6C, 6D, 6E, 6F are screenshots showing an example in-store experience rendered on an example device display, according to some embodiments.
Figure 6B:
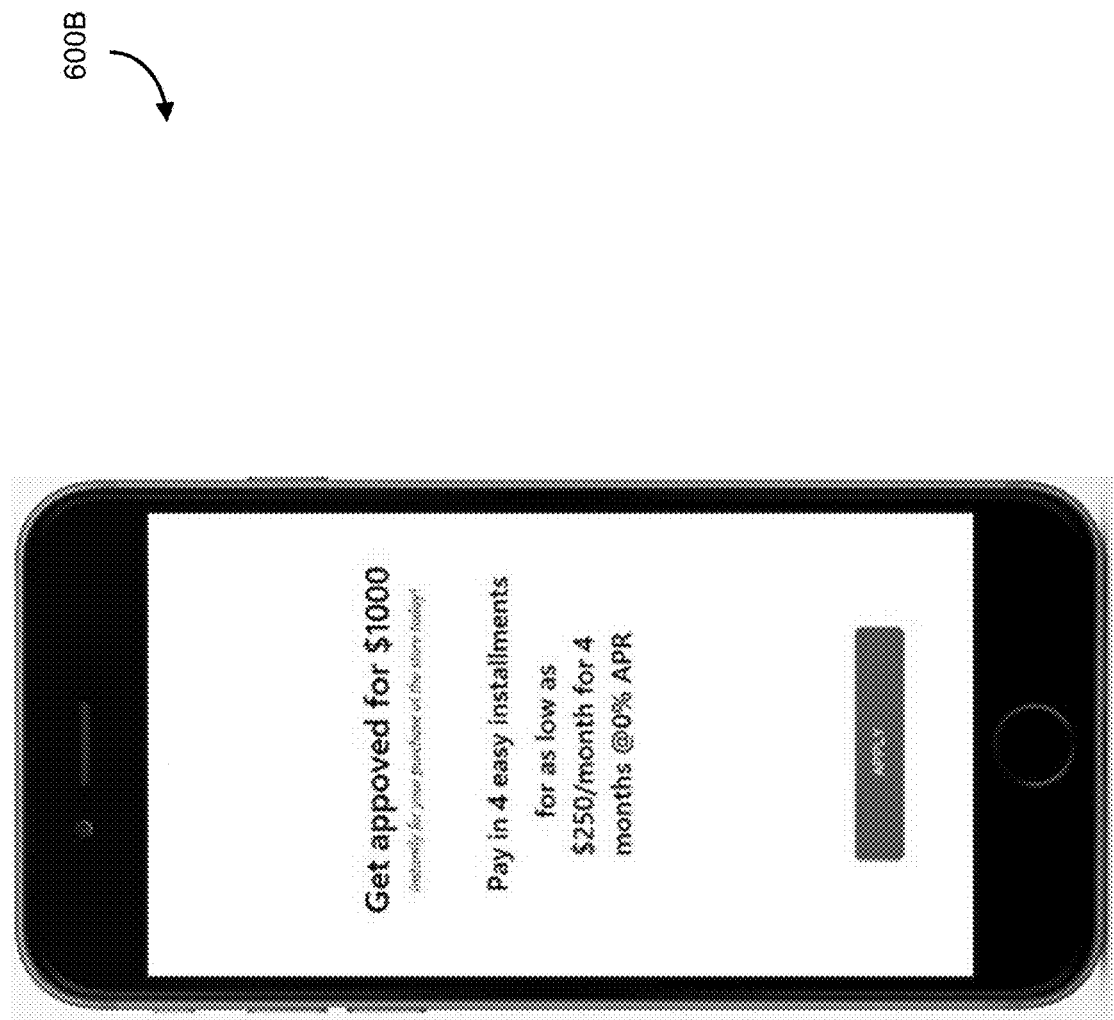

In FIG. 6A, a QR code is provided to the user that routes the user to a web portal for establishing a payment loan, and/or a check out process. Variations are possible, for example, whereby a dynamic card can be used multiple times during a period of time or for a single transaction, and these aspects can be configured and/or customized based on merchant controls and/or attributes, such as as spending limits, expiry dates, POS integration—QR, card details, scanning etc., among others, and the user experience can be tweaked, for example, based on the operational, marketing, training and management impact for the retailer.

Where the dynamic card is adapted for repeat usage, for example, during a short period of time with a single merchant, customer information can be persisted and in an additional loan request, their data/information is already pre-populated and their approval is faster, based, for example, on an unused portion of an already approved loan amount as extracted from a secure dynamic card token object.

In this example, the QR code is shown at a hardware store where an individual is seeking to purchase furniture. While the exact amount of the purchase may not yet be known (e.g., person may be seeking to add-on installation services, or different options for paint/trim), the approved amount may include some level of overage to account for the potential for add-ons.

Other types of encoding or graphical encoding other than QR codes are possible, or in some embodiments, a link is provided in an alternate format, such as printed on a placard. The placards, for example, can be placed around the retail store. Scanning the QR code, for example, with a user's client device, such as a mobile device, opens up a mobile-web page, shown at FIG. 6B.

A visual interface element is shown where the user is able to interact with it, for example, through touch input or keyboard input, to request a loan provisioning workflow to be initiated which, for example, when interacted with, begins credit verification and amount determining processes. For example, the user, through the interface, can provide information (e.g., mobile phone number, email address, etc.) about themselves and goes through the approval workflow on the mobile-web-app to get approved for a $X limit (e.g., $1000).

Figure 6C:
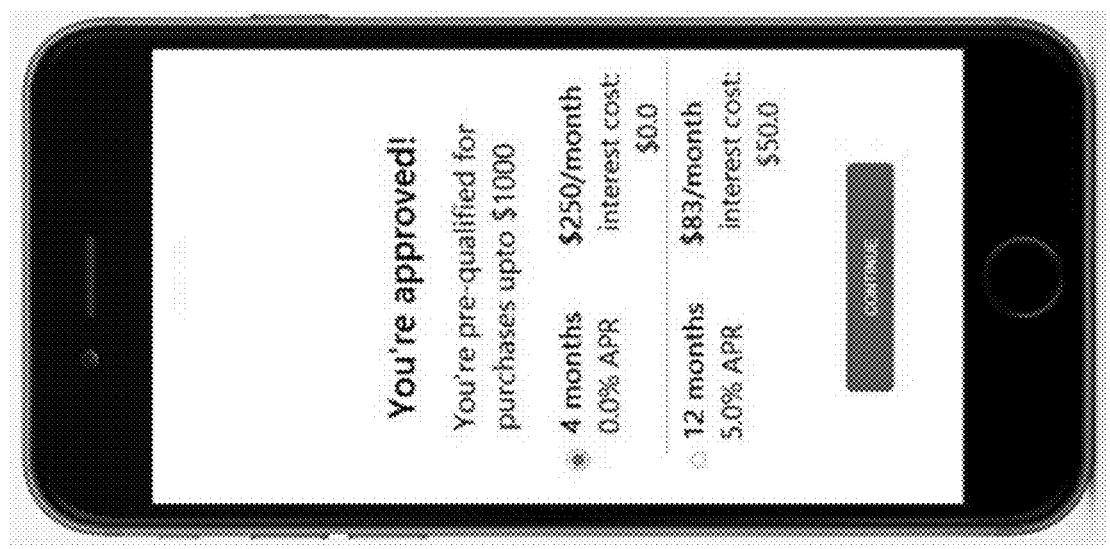

As shown in FIG. 6C, the customer is successfully pre-approved for $1000 and is shown a number of payment terms. When the user agree to the payment terms, for example, a one-time passcode (OTP) is sent to the customer's mobile phone number for 2FA.

Figure 6D:
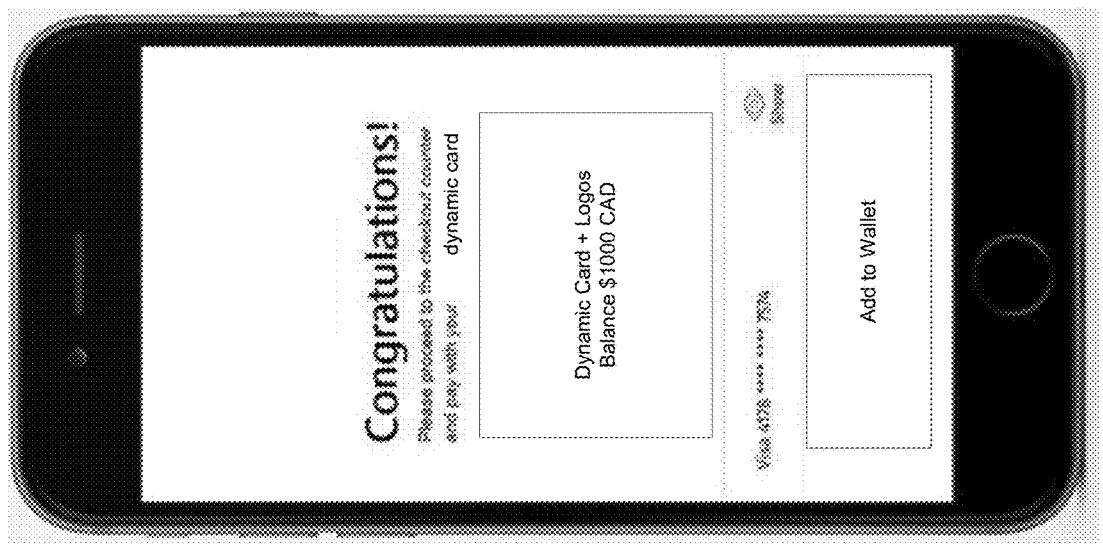

The customer can authenticate themselves by entering the OTP into the web-app to get access to a dynamic card that is provisioned at FIG. 6D. The dynamic card issued to the customer can be restricted only to the merchant-retail partner where the customer initiated the process. The dynamic card of FIG. 6D, in some embodiments, has a dynamic CVV which auto-generates a new CVV every couple of hours, for example, by establishing a rolling code or a periodic refresh. In some embodiments, an email can be sent to user's email address confirming the terms of agreement and a link to the web-app page.

When the pre-approval occurs, the dynamic card data object is established having an initial state where it has been provisioned and not yet used. The state machine listener daemon process may be initiated to listen (e.g., poll or receive) for data messages indicative of requested state changes. These data messages can be intercepted or provided by the merchant's web portal, through point-of sale devices, among others, where a verification data object can also be provided in accordance with any one of FIG. 2, 3, or 4 (e.g., in store or online).

The user can click the link in the email to access their dynamic card details on the web-app. The customer in this variation, may be able to access pages showing additional dynamic card details (#, dCVV, expiry date) for their loan on the web-app. In some embodiments, the dynamic card token data object can be generated as a wallet-enabled data object that can be loaded onto the user's mobile wallet, emulating, for example, a bank card or a credit card. The dynamic card token data object can be interacted with to trigger a state transition as noted above, pending verification in accordance with some embodiments.

Figure 6E:
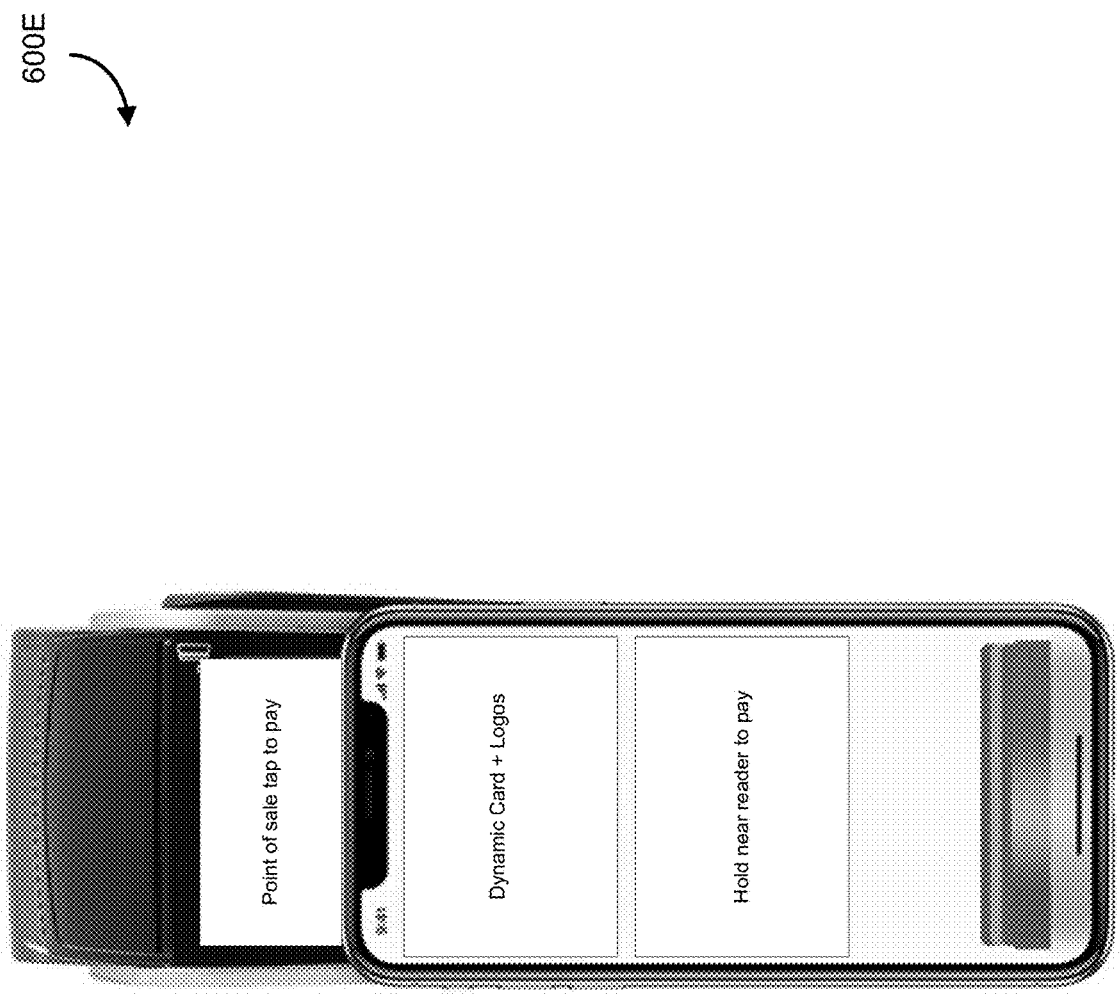

At FIG. 6E, an in-store example is provided whereby the user (e.g., customer) can tap their client device storing the dynamic card barcode or QR code at the POS terminal, which can then be read, for example, via near-field communications. In some embodiments, the dynamic card token data object can then be utilized to generate a data message sent across either wide-area communication networks, or near-field communications, the data message representing all or a portion of the fields of the dynamic card token data object such that the merchant POS terminal is able to initiate a transaction using the dynamic card token data object information. Additional security features can include, a dynamic CVV value that is generated on a rolling basis, for example, along with other verification information required, such as indicia linking the dynamic card token data object with another plastic card (see, for example, FIG. 3, where a nominal transaction is conducted against another plastic card with PIN authentication), among others.

Figure 6F:
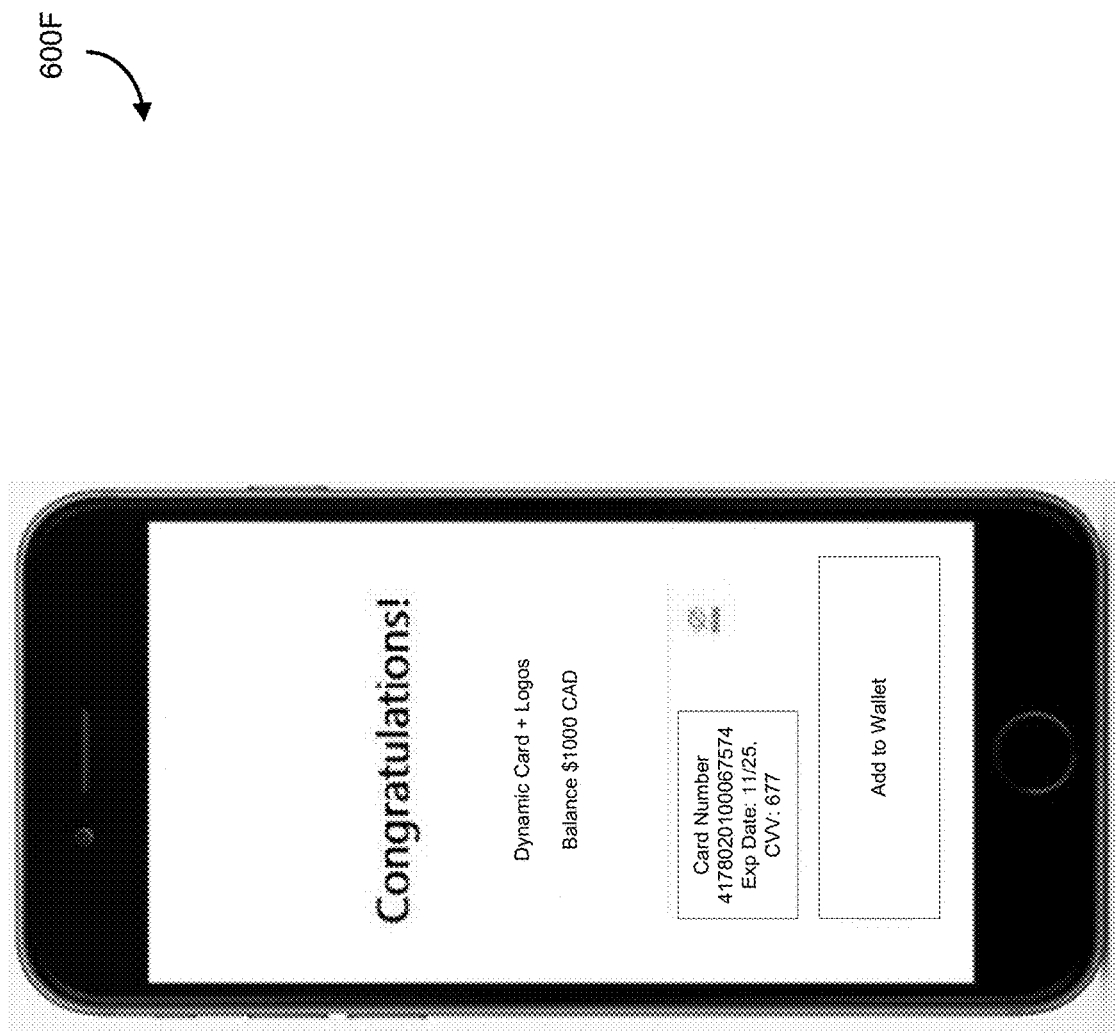

In this example, if the total purchase at the retail store is above $150, the user (e.g., customer) can provide the dynamic card details (#, CVV, expiry date) to the check-out personnel for payment, at FIG. 6F, where a successful checkout is applied using, for example, the dynamically generated CVV for a portion or all of the loan amount in the loan data object.

Prior to the successful checkout, the system may be configured to automatically enforce a requirement that a corresponding state transition must occur for the dynamic card token data object, shifting the state machine from one state to another and a corresponding backend reconciliation confirmation prior to funds being disbursed. Accordingly, the dynamic card token data object can be updated to shift to a partially used state, a fully used state, among others. Additional states can be used to track additional partial use states such that multiple uses, where permissible, can be conducted for a particular merchant to track, for example, multiple purchases (e.g., buying a console and then controllers in separate transactions).

Each time the customer makes a purchase using the dynamic card, an email can be sent to their email address confirming the details of the transaction and the balance remaining on their dynamic card. if the user closes the webpage where the dynamic card was displayed without saving the details, they can still access the web-app link on the email sent to them. In some embodiments, if the user doesn't end up using the full approved credit on their dynamic card, they can use the remaining credit at the same merchant-retail store until the expiry of the dynamic card. if the customer gets pre-approved for $X but they do not use the dynamic card, it may still be available for use to shop at the merchant-retail store until the expiry of the dynamic card. The dynamic card token data object can be automatically updated upon elapse of a duration of time indicative of the expiry of the dynamic card.

Figure 5:
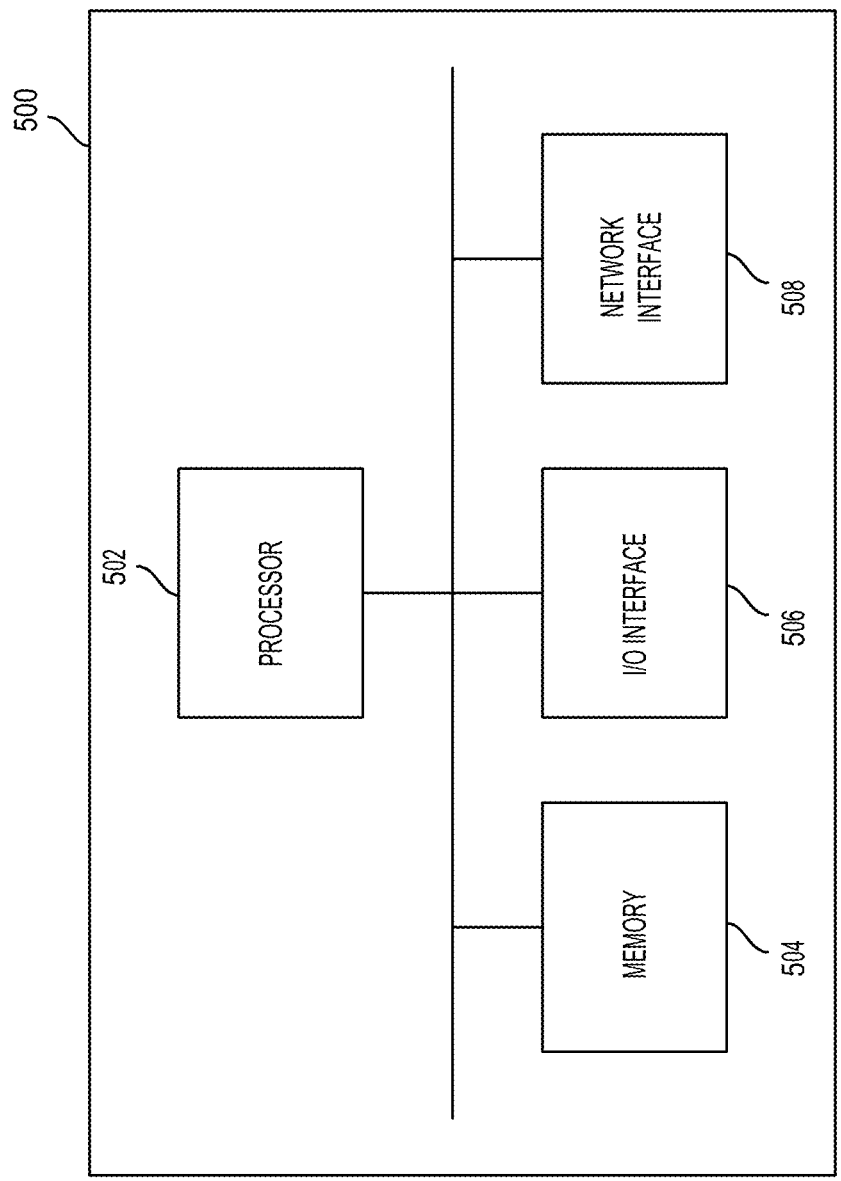
FIG. 5 is a block schematic of an example computer server, which can be utilized to implement the backend financial institution system described herein in various embodiments.

FIG. 5 is a block schematic of an example computer server, which can be utilized to implement the backend financial institution system described herein in various embodiments. The computer server can include a processor 502, computer memory 504, and an input/output interface 506. The processor 502 is a microprocessor or computer processor, and computer memory 504 can various combinations of random access, read only, and computer storage media, including, in some embodiments, cache memory, among others. The input/output interface 506 can be utilized to couple to various input or output mediums, such as keyboards, capacitive touch inputs, and output displays such as monitors, mobile phone displays, among others, or application programming interfaces (APIs) for communication with upstream or downstream systems. A network interface 508 is utilized to communicate with other computing devices, for example, through a network connected to the Internet or an intranet, or a combination thereof.

The system 102 can, in some embodiments, be physically implemented as a server or a computer 500 residing in a data center associated with the financial institution, configured to handle incoming requests for loans being established for users seeking to transact in (i.e., purchase) goods or services at merchants and to orchestrate the identity and loan transaction process such that the transaction can be satisfied through a loan provisioned by the financial institution and ultimately paid out to the merchant in partial or full payment for what is owed by the user.

The server or computer 500 residing in the data center can interact with other financial institution subsystems, such as upstream systems (e.g., information data storage repositories for identify and account verification) and downstream systems (e.g., updating computerized records or repositories of loan amounts based on transactions conducted to ensure that records are up to date and that the individual has not exceeded the parameters of the loan).

Accordingly, the system can provide an financial institution agnostic solution for point of sale lending, leveraging advances in identity technology and dynamic tokenization for representing dynamic card technology. A loan account can be securely and conveniently established whereby the identity technology utilizes identity tokens that enable secure know-your-client credentials as well as the ability to obtain account number details from a financial institution, which is useful for establishing a loan and repayment thereof. A useful electronic payment mechanism that is shared with the merchant or point of sale is established without a need to issue a plastics card to the client that has been issued the loan, and the loan can be a reusable credit with a given credit amount.

Accordingly, the system enables point of sale lending at a merchant terminal, which is at the physical store, while also being to use the same solution for web. In some embodiments, the system described herein can be utilized as a substitute, or an underlying technology for a credit card transaction (e.g., for individuals who may not otherwise qualify for a credit card). The total available loan amount, for example, can be established based on a credit card limit. In such a solution, stronger technological safeguards are used for identity attestation that may not be otherwise available in a credit card transaction.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A system for secure identity data tokenization and processing, the system including a computer processor and computer memory operating in conjunction with a non-transitory computer readable storage medium, the computer processor configured to:

upon being triggered by a user interface interaction tracked against an interactive widget on a first graphical user interface, receive-a loan provisioning request from a merchant computing device associated with an individual establishing payment or a proxy thereof representing a future payment using a loan provided by a financial institution;

receive, from a secure identity verification computing device, a secure identity token data object attesting to an identity of the individual;

process the secure identity token data object, verifying the identity of the individual and initiating a loan origination process for a dynamic card token data object having a unique loan identifier data value and maintained on the non-transitory computer readable storage medium, the loan origination process automatically associating the dynamic card token data object with an amount of funds from a revolving loan account that is re-usable across a plurality of transactions, the dynamic card token data object including a rolling or periodically refreshed dynamic card verification value and a usage state value;

receive-a request for an electronic transaction to be paid or partially paid using funds represented in the dynamic card token data object associated with the unique loan identifier data value;

generate a payment package data object encapsulating a tokenized representation of a dynamic card data object associated with the dynamic card token data object, the rolling or periodically refreshed dynamic card verification value at a time of the transaction, and an electronic representation of the funds to be provided from the dynamic card token data object, the generation of the payment package data object triggering a state transition of the usage state value indicating that a pre-approval has occurred for the electronic transaction; and transmit the payment package data object to the merchant computing device through a second application programming interface, the merchant computing device processing the payment package data object in completion of the electronic transaction only if a corresponding state transition of the usage state value has occurred as validated by a state machine listener daemon process listening for the one or more data messages signed by the public encryption key corresponding to a trusted financial institution that will be disbursing the funds indicative of requested state changes;

wherein the dynamic card token data object is adapted for repeat usage during a period of time by the merchant computing device using the unique loan identifier data value, and the dynamic card token data object is configured to automatically generate new dynamic card verification values during the period of time for future re-use, the state transition utilized ensuring workflow continuity between the first graphical user interface and the second application programming interface; and wherein the dynamic card token data object is modified when the payment package data object is generated, -updating a data value representing an outstanding amount.

2. The system of claim 1, wherein the electronic transaction is related to a transaction that is being conducted in a physical premises associated with or proximate to the merchant computing device.

3. The system of claim 2, wherein the computer processor is configured to initiate a physical client verification process prior to the generation of the payment package data object, the physical client verification including a validation, by the merchant computing device, of a physical card provided by the individual where the individual provides a secure authentication code to conduct a nominal transaction to obtain a nominal transaction success data object; and wherein the nominal transaction success data object is required prior the generation of the payment package data object.

4. The system of claim 2, wherein the computer processor is configured to initiate a virtual client verification process prior to the generation of the payment package data object, the virtual client verification including a second validation, by the secure identity verification computing device, of the individual's identity where the individual requests a second secure identity token data object; and wherein a verification of the second secure identity token data object is required prior the generation of the payment package data object.

5. The system of claim 1, wherein the secure identity verification computing device is a cross-financial institution computing service wherein the secure identity verification computing device is configured to generate the secure identity token data object upon a successful registration of the individual on the secure identity verification computing device.

6. The system of claim 1, wherein the dynamic card token data object includes a dynamically generated account number that is stored on the non-transitory computer readable storage medium.

7. The system of claim 1, wherein the computer processor resides within a computer server operating in a data centre, and the computer server and the merchant computing device are in electronic communication.

8. The system of claim 1, wherein the merchant computing device is a payment mechanism of a web-based platform.

9. The system of claim 1, wherein the merchant computing device is a physical point of sale computing device residing within or proximate to a physical store.

10. A method for secure identity data tokenization and processing, the method comprising:

upon being triggered by a user interface interaction tracked against an interactive widget on a first graphical user interface, receiving a loan provisioning request from a merchant computing device associated with an individual establishing payment or a proxy thereof representing a future payment using a loan provided by a financial institution;

receiving, from a secure identity verification computing device, a secure identity token data object attesting to an identity of the individual;

processing the secure identity token data object, verifying the identity of the individual and initiating a loan origination process for a dynamic card token data object having a unique loan identifier data value and maintained on the non-transitory computer readable storage medium, the loan origination process automatically associating the dynamic card token data object with an amount of funds from a revolving loan account that is re-usable across a plurality of transactions, the dynamic card token data object including a rolling or periodically refreshed dynamic card verification value and a usage state value;

receiving a request for an electronic transaction to be paid or partially paid using funds represented in the dynamic card token data object associated with the unique loan identifier data value;

generating a payment package data object encapsulating a tokenized representation of a dynamic card data object associated with the dynamic card token data object, the rolling or periodically refreshed dynamic card verification value at a time of the transaction, and an electronic representation of the funds to be provided from the dynamic card token data object, the generation of the payment package data object triggering a state transition of the usage state value indicating that a pre-approval has occurred for the electronic transaction; and transmitting the payment package data object to the merchant computing device, the merchant computing device through a second application programming interface, processing the payment package data object in completion of the electronic transaction only if a corresponding state transition of the usage state value has occurred as validated by a state machine listener daemon process listening for the one or more data messages signed by the public encryption key corresponding to a trusted financial institution that will be disbursing the funds indicative of requested state changes; wherein the dynamic card token data object is adapted for repeat usage during a period of time by the merchant computing device using the unique loan identifier data value, and the dynamic card token data object is configured to automatically generate new dynamic card verification values during the period of time for future re-use, the state transition utilized ensuring workflow continuity between the first graphical user interface and the second application programming interface; and wherein the dynamic card token data object is modified when the payment package data object is generated, updating a data value representing an outstanding amount.

11. The method of claim 10, wherein the electronic transaction is related to a transaction that is being conducted in a physical premises associated with or proximate to the merchant computing device.

12. The method of claim 11, comprising initiating a physical client verification process prior to the generation of the payment package data object, the physical client verification including a validation, by the merchant computing device, of a physical card provided by the individual where the individual provides a secure authentication code to conduct a nominal transaction to obtain a nominal transaction success data object; and wherein the nominal transaction success data object is required prior the generation of the payment package data object.

13. The method of claim 11, comprising initiating a virtual client verification process prior to the generation of the payment package data object, the virtual client verification including a second validation, by the secure identity verification computing device, of the individual's identity where the individual requests a second secure identity token data object; and wherein a verification of the second secure identity token data object is required prior the generation of the payment package data object.

14. The method of claim 10, wherein the secure identity verification computing device provides a cross-financial institution computing service wherein the secure identity verification computing device is configured to generate the secure identity token data object upon a successful registration of the individual on the secure identity verification computing device.

15. The method of claim 10, wherein the dynamic card token data object includes a dynamically generated account number that is stored on a non-transitory computer readable storage medium.

16. The method of claim 10, wherein the merchant computing device is a payment mechanism of a web-based platform.

17. The method of claim 10, wherein the merchant computing device is a physical point of sale computing device residing within or proximate to a physical store.

18. A non-transitory, computer readable medium, storing machine interpretable instructions, which when executed, cause a processor to execute a method comprising:

upon being triggered by a user interface interaction tracked against an interactive widget on a first graphical user interface, receiving a loan provisioning request from a merchant computing device associated with an individual establishing payment or a proxy thereof representing a future payment using a loan provided by a financial institution;

receiving, from a secure identity verification computing device, a secure identity token data object attesting to an identity of the individual;

processing the secure identity token data object, verifying the identity of the individual and initiating a loan origination process for a dynamic card token data object having a unique loan identifier data value and maintained on the non-transitory computer readable storage medium, the loan origination process automatically associating the dynamic card token data object with an amount of funds from a revolving loan account that is re-usable across a plurality of transactions, the dynamic card token data object including a rolling or periodically refreshed dynamic card verification value and a usage state value;

receiving a request for an electronic transaction to be paid or partially paid using funds represented in the dynamic card token data object associated with the unique loan identifier data value;

generating a payment package data object encapsulating a tokenized representation of a dynamic card data object associated with the dynamic card token data object, the rolling or periodically refreshed dynamic card verification value at a time of the transaction, and an electronic representation of the funds to be provided from the dynamic card token data object, the generation of the payment package data object triggering a state transition of the usage state value indicating that a pre-approval has occurred for the electronic transaction; and transmitting the payment package data object to the merchant computing device through a second application programming interface, the merchant computing device processing the payment package data object in completion of the electronic transaction only if a corresponding state transition of the usage state value has occurred as validated by a state machine listener daemon process listening for data messages signed by a public encryption key corresponding to a trusted financial institution that will be disbursing the funds indicative of requested state changes; wherein the dynamic card token data object is adapted for repeat usage during a period of time by the merchant computing device using the unique loan identifier data value, and the dynamic card token data object is configured to automatically generate new dynamic card verification values during the period of time for future re-use, the state transition utilized ensuring workflow continuity between the first graphical user interface and the second application programming interface; and wherein the dynamic card token data object is modified when the payment package data object is generated, updating a data value representing an outstanding amount.

\* \* \* \* \*